(12) United States Patent
De Boer

(10) Patent No.: US 10,995,731 B2
(45) Date of Patent: May 4, 2021

(54) METHOD FOR CONTROLLING A WIND TURBINE

(71) Applicant: Wobben Properties GmbH, Aurich (DE)

(72) Inventor: Wolfgang De Boer, Moormerland (DE)

(73) Assignee: Wobben Properties GmbH, Aurich (DE)

( * ) Notice: Subject to any disclaimer, the term of this patent is extended or adjusted under 35 U.S.C. 154(b) by 402 days.

(21) Appl. No.: 16/061,622

(22) PCT Filed: Dec. 9, 2016

(86) PCT No.: PCT/EP2016/080366
§ 371 (c)(1),
(2) Date: Jun. 12, 2018

(87) PCT Pub. No.: WO2017/102570
PCT Pub. Date: Jun. 22, 2017

(65) Prior Publication Data
US 2020/0263660 A1 Aug. 20, 2020

(30) Foreign Application Priority Data

Dec. 17, 2015 (DE) .................. 10 2015 122 039.3

(51) Int. Cl.
*F03D 7/02* (2006.01)
*F03D 17/00* (2016.01)
*F03D 7/04* (2006.01)

(52) U.S. Cl.
CPC .......... *F03D 7/0224* (2013.01); *F03D 17/00* (2016.05); *F03D 7/042* (2013.01); *F05B 2260/76* (2013.01); *F05B 2270/32* (2013.01); *F05B 2270/322* (2013.01); *F05B 2270/327* (2013.01); *F05B 2270/328* (2013.01)

(58) Field of Classification Search
CPC .......... F03D 7/0224; F03D 17/00; F03D 7/042
See application file for complete search history.

(56) References Cited

U.S. PATENT DOCUMENTS

| | | | |
|---|---|---|---|
| 6,909,198 | B2 | 6/2005 | Ragwitz et al. |
| 10,027,266 | B2 | 7/2018 | Beekmann et al. |
| 2009/0047116 | A1 | 2/2009 | Barbu et al. |

FOREIGN PATENT DOCUMENTS

| | | |
|---|---|---|
| EP | 1299779 B1 | 11/2005 |
| EP | 2022981 A1 | 2/2009 |
| EP | 2251543 A1 | 11/2010 |
| EP | 2481921 A2 | 8/2012 |
| EP | 2757251 A1 | 7/2014 |
| EP | 2583125 B1 | 1/2015 |

(Continued)

*Primary Examiner* — Viet P Nguyen
(74) *Attorney, Agent, or Firm* — Seed IP Law Group LLP

(57) ABSTRACT

A method for controlling a wind turbine with rotor blades with an adjustable blade angle, comprising: operating the wind turbine in a part-load operation for wind speeds up to a rated wind speed, operating the wind turbine in a full-load operation for wind speeds above the rated wind speed, with the blade angle being increased in full-load operation with increasing wind speed, setting a limit angle as a minimum value of the blade angle, and controlling the wind turbine in such a way that the limit angle is undershot by at most a predetermined difference angle.

18 Claims, 2 Drawing Sheets

(56) References Cited

FOREIGN PATENT DOCUMENTS

| EP | 3029318 A1 | 6/2016 | |
|---|---|---|---|
| JP | 5832343 B2 | 12/2015 | |
| KR | 101545072 B1 | 8/2015 | |
| WO | 2008086608 A1 | 7/2008 | |
| WO | WO-2015085465 A1 * | 6/2015 | ........... G05B 19/042 |

* cited by examiner

METHOD FOR CONTROLLING A WIND TURBINE

BACKGROUND

Technical Field

The present invention relates to a method for controlling a wind turbine having adjustable rotor blades. Moreover, the present invention relates to a corresponding wind turbine with such a control method.

Description of the Related Art

Wind turbines, especially those as shown in FIG. 1, often have rotor blades with an adjustable blade angle. Controlling such a wind turbine regularly includes distinguishing between a part-load operation and a full-load operation. In the part-load operation, the wind turbine is regularly operated up to a rated wind speed, with the rotor blades having a fixed blade angle, which is also referred to here as part-load angle, in the process.

If the wind speed has reached the rated wind speed and increases further, the rotor blades are successively adjusted in terms of their angle of attack, namely rotated out of the wind in order to avoid too high a loading of the wind turbine. This operation above the rated wind speed is also referred to as full-load operation and attempts are made here to keep the rotational speed at the rated rotational speed and keep the emitted power at the rated power. Neither rotational speed nor power should exceed these values, at best by small values.

In this way, a regulation ensures that the rotational speed approximately maintains this rated rotational speed value. In principle, this can be also based on another value other than the rated rotational speed or rated power, although this is unusual.

In any case, expressed in a simplified manner, a rotational speed regulation is carried out here in such a way that the blades are rotated further out of the wind in the case of an increasing wind in order thereby to be able to keep the rotational speed at its value. If the wind drops off again, the blades are correspondingly rotated back into the wind.

Should this regulation fail for any reason such that the blades are not rotated out of the wind in the case of increasing wind, the rotational speed may rise to an undesirably high value. An emergency shut down, in which the wind turbine shuts down if a corresponding overspeed value is exceeded, is provided in order to protect the wind turbine from such overspeed. Then, the rotor blades are rotated with an emergency adjustment in a feathered position.

The disadvantage here is that this overspeed limit often lies only slightly above the rated rotational speed for safety reasons and what may therefore occur is that the regulation cannot rotate the rotor blades out of the wind quickly enough, and so this emergency shut down responds even though no emergency is present as the rotational speed regulation, in principle, works properly but could not respond quickly enough in this particular case. Here, there is no danger to the wind turbine because briefly exceeding this overspeed limit is uncritical. Only a pronounced and/or long-duration instance of exceeding said overspeed limit becomes problematic.

The German Patent and Trade Mark Office has searched the following prior art in the priority application relating to the present application: US 2009/0047116 A1, EP 1 299 779 B1, EP 2 583 125 B1, EP 3 029 318 A1 and WO 2008/086608 A1.

BRIEF SUMMARY

A method for controlling a wind turbine having rotor blades with an adjustable blade angle is provided. For wind speeds up to a rated wind speed, the wind turbine is operated in a part-load operation in a manner known per se. The wind turbine is operated in a full-load operation for wind speeds above the rated wind speed, with the blade angle being increased in full-load operation with increasing wind speed, namely adjusted in the direction of the feathered position.

Now, a limit angle is set as a minimal value of the blade angle and the wind turbine is controlled in such a way that the limit angle is undershot by at most a predetermined difference angle. This predetermined difference angle can also have a value of zero, depending on how the limit angle is set. Preferably, the limit angle and/or the difference angle are time-varying variables.

Unwanted overshooting of an overspeed limit value, which leads to the wind turbine being shut down, only occurs in very specific situations. One such special situation is where a gusty wind is present, said wind also having short periods of very weak wind in addition to gusts. Expressed in a simplified manner, a temporary lull or a gust trough may be present between two gusts in the case of gusty winds. For the rotational speed feedback control, this would mean that the blades are adjusted into the wind in such a gust trough, when a very low wind speed is present. Then, there may be a strong gust which accelerates the rotor following this gust trough, with it not being possible to rotate the rotor blades out of the wind quickly enough because they were rotated very strongly into the wind on account of the gust trough, i.e., the temporary very low wind speed. Before the rotor blades can be rotated back from this position, the rotational speed may have already exceeded said overspeed limit value, having as a consequence that an unwanted emergency shut down is introduced.

It was also recognized that the blade angle adjustment at the start of the full-load operation, i.e., starting from the part-load angle, initially has little effect. Thus, at the outset, when the wind speed is only slightly higher than the rated wind speed, the blade angle nevertheless needs to be adjusted by quite a number of angle degrees so that a noticeable effect sets in, i.e., so that the rotational speed can be kept approximately at the rated rotational speed. As a result, a problem arising, especially at the outset, is that the blade angle is greatly modified even though the wind speed has not changed a lot. Thus, much adjustment power is necessary in this case and implementing the adjustment may take a comparatively long time.

In order to avoid this, the limit angle is set as a minimum value of the blade angle. If the above-described gust trough now occurs, it is possible to initially reduce the rotor blade angle, namely rotate the latter into the wind, but only until the limit angle has been undershot by the predetermined difference angle. A further reduction in the blade angle is prevented. This prevents the blade angle from moving too far from a value that may need to be readopted shortly in such a gusty wind situation.

Expressed differently, the blade angle is initially in the correct position in a gust. If the lull or the gust trough now occurs, the angle is nevertheless not rotated very far away from this position, which was still adopted during the gust. Once the gust trough has ended and a strong gust occurs again, the blade angle need only be rotated back by a small value to the angle that is suitable for this now reoccurring gust.

Consequently, by setting the limit angle, a simple pragmatic solution is created, said solution otherwise leaving the present rotational speed feedback control, which adjusts the blade angle, unchanged. Only such a limit angle, which should be observed as an additional condition, is specified. It is possible to temporarily set the limit angle and/or the difference angle.

An embodiment proposes that setting of the limit angle and in addition or alternatively controlling the wind turbine in such a way that the limit angle is undershot only by a predetermined difference angle is only effectuated if at least one predetermined gust frequency and/or a gustiness of the wind has been set. Additionally or alternatively, a check can be carried out as to whether a peak rotational speed, which lies above the rated rotational speed by more than a predetermined tolerance value, is captured at least once within a predetermined period of time. During running operation, the rotational speed cannot be kept exactly at a setpoint value and small variations of the rotational speed about the setpoint value thereof, the rated rotational speed during full-load operation, arise. The higher rotational speeds that occur briefly in this case form these peak rotational speeds and provide an indication about the gustiness of the wind. An example of such a peak rotational speed is shown schematically in FIG. 2 after the time T1. Monitoring the peak rotational speeds is consequently a simple way of estimating the gustiness of the wind. This is because it was recognized that the rated rotational speed being exceeded is an indicator for the gustiness of the wind.

Thus, the limit angle is not set and there is no corresponding control of the wind turbine in wind situations that do not have great gustiness of the wind.

Here, a gust is defined as set forth below:

A gust occurs if the measured 1-minute mean value of the wind speed is exceeded by at least 3 m/s within a few seconds, for example for at most 20 seconds and at least 3 seconds continuously. Defining a gust can also be undertaken by way of a comparison of the current wind speed to a 10-minute mean, with it being possible for a lower excess, e.g., in the region of 1.7 m/s, to be considered to be a gust. A gust can be determined correspondingly and hence it is also possible to count gusts and thus determine their frequency, i.e., occurrences per time interval.

Therefore, a gust frequency is a measure that specifies how often a gust occurs in a predetermined time interval. A gustiness specifies the size of the portion of gusts in the prevalent wind.

As a result, the rotational feedback control remains uninfluenced by this solution during the majority of its use, i.e., whenever the gustiness of the wind is not too great. Such a limit angle is set or the corresponding control is implemented only once gustiness has been determined. In this respect, two options can be considered in respect of activating this proposed solution only in the case of gustiness in the wind. The first option consists of only even setting a limit angle in that case. Thus, a limit angle that never comes to bear, for example because it has a high negative value, could be set previously as a limit angle. Additionally, or alternatively, the control can be easily activated or deactivated again depending on the gustiness. In this case, a limit angle could always be set to a value that is effective as well, with this value only coming to bear once the corresponding feedback control is activated. Alternatively, the difference angle could also assume such a great value that the limit angle is never undershot by such a difference angle. Otherwise, the difference angle can lie in the region of 5°, for example, as will be explained in more detail below.

Instead or additionally:
a predetermined gustiness of the wind is reached,
a predetermined gust frequency of the wind is reached, and
a peak rotational speed, which lies above the rated rotational speed by more than a predetermined tolerance value, is captured at least once within a predetermined period of time.

A further configuration proposes that the limit angle is set depending on a captured gustiness. Consequently, the size and/or the dynamics of such a limit angle can also be set depending on a captured gustiness. What is considered in this case, in particular, is to set the limit angle ever higher with increasingly gusty wind. Consequently, the described effect can be set to a value that is as high as possible in the case of a particularly strong gustiness of the wind, i.e., if many gusts with a high amplitude, too, occur, which is regularly also accompanied by correspondingly deep gust troughs. A similar effect can be obtained by virtue of the difference angle being set depending on the captured gustiness. Thus, in terms of absolute value, too, the difference angle should be selected to be particularly small if there is particularly strong gustiness with high gust amplitudes and also gust troughs with very low wind speeds.

Preferably, the predetermined difference angle will have a value that is selected from the list including a value range of 0 to 10°, 3 to 8° and a value of 5°. Thus, the difference angle preferably lies in a range from 0 to 10°, especially in a range from 3 to 8° and, in particular, it has a value of approximately 5°.

Particularly if the limit angle approximately corresponds to the last-set, large value of the blade angle, a value of approximately 5° causes the blade angle not to move far away from the last value. Thus, if the above-described lull or the above-described gust trough occurs and if the angle would then be rotated back very strongly, for example by 20 or 30°, without this restriction by the limit angle, the restriction to approximately 5° in this case would prevent this large difference and, should a gust reoccur, said angle is not very far away from the angle that would have to be set in that case.

A value in the range from 3 to 8° can also be selected instead of a value of approximately 5°. This also still allows a good restriction to be obtained by way of such a difference angle. A range from 0 to 10° also comes into consideration. In this respect, 10° is already a large value for the difference angle, but it may possibly still be sufficient; in any case, it is a significantly smaller value in comparison with the deviations of 20 or 30° mentioned above in an exemplary manner. A lower limit of 0° for the difference angle is proposed such that at least the limit angle would have to be reached for the restriction of the blade angle below to come into effect.

Having said that, the limit angle also could be modified by an arbitrary value from a purely computational point of view, of course, and the difference angle could be modified by this arbitrary value in the same way. Although this is not proposed, the result would end up the same and hence, as a result, this would realize the teaching described herein. Thus, if a limit angle of 20° is set in relation to a current instant and a difference angle of 5° is chosen, the blade angle must not drop below 15° at this moment.

An embodiment proposes that the limit angle is ascertained as a mean value or a filtered value of the last set blade angles. Expressed in slightly simplified manner, the limit angle approximately assumes the last blade angle value set, but changes substantially more sluggishly. The underlying concept in this case is that, by way of a limit angle chosen thus together with a difference angle that is greater than zero, the blade angle does not deviate from this value, corresponding approximately to its last value, more strongly than by said difference angle.

The sluggish change can be effectuated here by forming a mean value, for example, by virtue of averaging over the last 8 seconds the blade angles set during this time. If the wind now drops off significantly and if the controller attempts to correspondingly strongly reduce the blade angle, this will quickly hit the limit arising from the limit angle and difference angle. However, the limit angle will also follow this at least slightly reduced blade angle slowly, and so there is also a reduction in the limit angle, albeit very slowly. What this can achieve is that there cannot be a strong reduction in the blade angle, and hence in the limit angle, too, during the above-described gust trough, which should not persist for very long, because the time duration of the gust trough is too short to this end. However, should the wind remain permanently at a low value, the limit angle can also reduce accordingly and the blade angle can ultimately also assume a correspondingly low value, which is suitable for the then prevailing weak wind speed. This is because if the wind speed is low for a relatively long period of time, a sudden gust is also no longer expected and hence the installation may also deviate by a high value in terms of its blade angle from a blade angle that would be necessary for a strong gust or otherwise high wind speed.

A similarly sluggish behavior of the limit angle, based on the last set blade angles, can be achieved by way of appropriate filtering, in particular by way of a low-pass filter response. A simple and efficient option for such filtering lies in the use of a first-order delay member. The limit angle would then be the output of such a first-order delay member which has as an input the current blade angle.

Preferably, different options for determining the limit angle are proposed, specifically forming a mean value of the last set blade angles over a period of time with a length of 5 to 20 seconds, preferably over a period of time with a length of 6 to 15 seconds, in particular over a period of time with a length of approximately 8 seconds. Appropriate time constants also can be set as a result thereof, said time constants being set by the proposed ranges or the proposed value for the length of the averaging time periods. By choosing an averaging length in the range of 5 to 20 seconds, it is possible to satisfy requirements which, firstly, obtain sufficient sluggishness for the change in the limit angle so that the blade angle does not drop off too strongly too quickly and then cannot be rotated to the desired high-value quickly enough in the case of a returning gust. Secondly, too sluggish behavior, as a result of which the capability of the wind turbine is impaired by the feedback control that is too poor, is also avoided. Selecting the time period for averaging from the range of 6 to 15 seconds takes these two criteria into account even more. Choosing a period of time of approximately 8 seconds can be seen to be a good value, which considers both criteria well.

Likewise, provision can be made of low-pass filtering, which chooses time constants in the range of 5 to 20 seconds, preferably in the range of 6 to 15 seconds and, in particular, a time constant of approximately 8 seconds, particularly if use is made of a first-order low-pass filter. The advantageous effect emerges from the same explanations as provided above in relation to the choice of the averaging length in respect of forming the mean value.

The use of a first-order low-pass filter, in particular of a so-called PT1 response or VZ1 response, is advantageous because such a response is free from overshoots. Likewise, higher order low-pass filters can also be used in the case of a similar choice of time constants. The remaining parameters should preferably be selected in such a way that the filter does not tend to overshoot. However, a first-order low-pass filter or a mean value formation should usually be sufficient.

One embodiment proposes that the limit angle and moreover, or alternatively, the difference angle is set depending on a gust frequency. This should be understood to be a measure specifying how often a gust occurs within a predetermined time interval. If this gust frequency is approximately known, it is possible to make good estimates as to how strongly the above-described phenomenon of the fast return of a gust after a gust trough occurs. If this behavior has a weaker embodiment, i.e., if there is a less strong gust return after a gust trough, the difference angle can be larger. Thus, a greater or faster change of the blade angle can be admitted. Here too, the interaction between limit angle and difference angle is important. By way of example, the limit angle can be set unchanged and only the difference angle can be set depending on the gust frequency. On the other hand, the limit angle, instead, could be set depending on a gust frequency. Here, it is possible to consider, in particular, setting a time constant or time duration of the averaging time period when forming the mean value for the limit angle depending on a gust frequency. Here, the time period for forming the mean value or the time constant of the low-pass filter should be set to be greater with increasing gust frequency.

Likewise, both setting the limit angle and predetermining the difference angle can be carried out in a manner depending on the gust frequency, but in a manner coordinated to one another.

According to one embodiment, the assumption is made that a fixed part-load angle is provided for the blade angle during the part-load operation. The suggestion to this end is that the limit angle or the limit angle minus the difference angle is not smaller than this part-load angle. Usually, the blade angle is not set to be smaller than the part-load angle in any case and, in this respect, also restricting the limit angle or the limit angle minus the difference angle to this was identified as being expedient.

One embodiment proposes that the limit angle decreases over time and/or decreases with a gradient that is dependent on time, in particular decreases linearly. As a result of this, it is possible to achieve a similar effect to when the limit angle is set by forming a mean value or carrying out low-pass filtering, as described above. What this decrease over time, which can be predetermined by way of a gradient that depends on time, achieves is that it is possible initially to select a limit angle which prevents the blade angle from being reduced too strongly after a gust. However, if a low wind speed persists for a long time, it should also be possible to reduce the blade angle accordingly after a certain amount of time. This can be achieved by the proposed change of the limit angle over time and/or by way of a temporal gradient.

According to the invention, a wind turbine having at least one adjustable rotor blade, preferably having three adjustable rotor blades, and accordingly also having a controller for adjusting this rotor blade or these rotor blades is proposed. According to the invention, the controller is configured to carry out a method according to at least one of the above-explained embodiments. In particular, the configuration of the controller can also be realized by virtue of a corresponding method being programmed into a control program.

Consequently, a wind turbine is proposed, said wind turbine having efficient protection which prevents an inadvertent overspeed from occurring in the case of a great change between gust and lull or gust trough and another gust and causing the wind turbine to carry out an emergency shut down even though there is no fault in the rotational speed feedback control. This is because the proposed method prevents such an overspeed from occurring despite an operational feedback control.

BRIEF DESCRIPTION OF THE SEVERAL VIEWS OF THE DRAWINGS

The invention is explained in more detail below in an exemplary manner, with reference being made to the attached figures.

DETAILED DESCRIPTION

Figure 1:
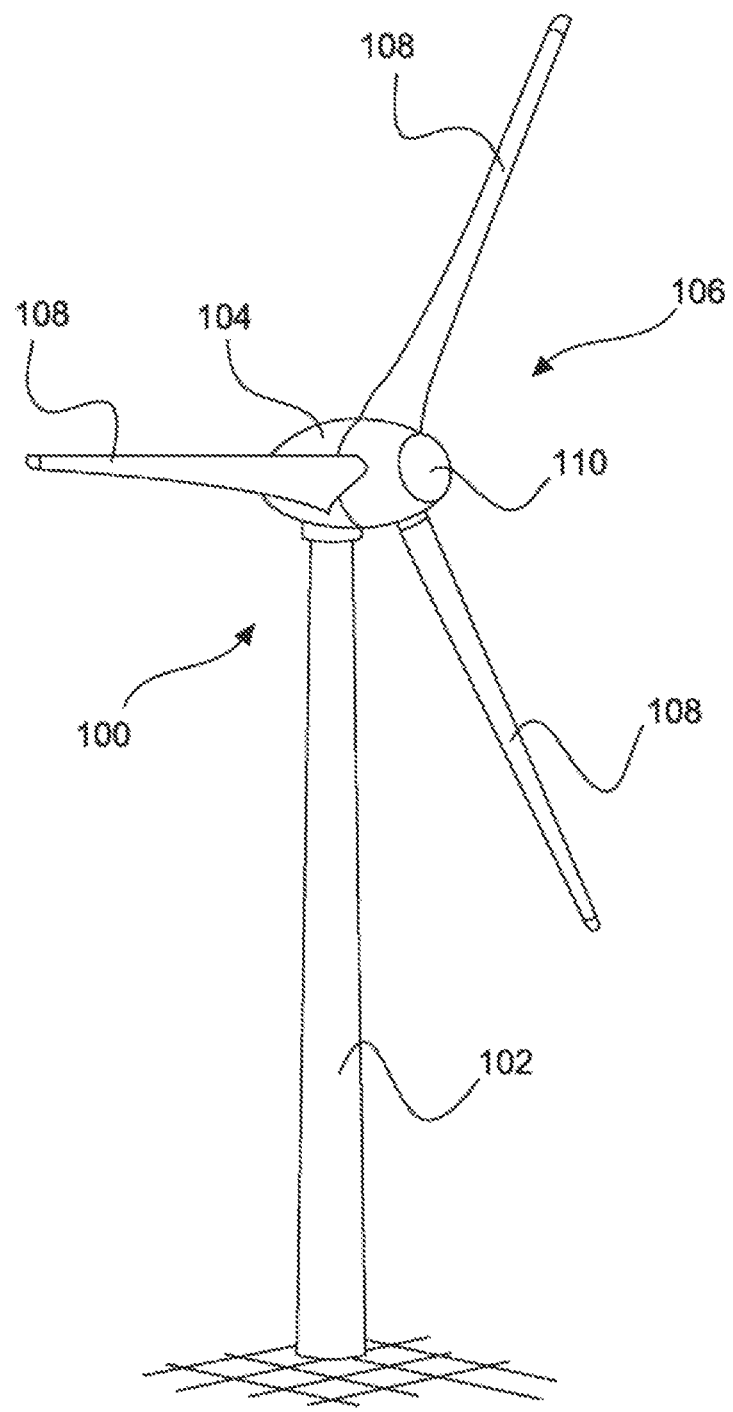
FIG. 1 shows a wind turbine in a perspective view.

FIG. 1 shows a wind turbine 100 with a tower 102 and a nacelle 104. A rotor 106 with a three rotor blades 108 and a spinner 110 are arranged on the nacelle 104. During operation, the wind puts the rotor 106 into a rotational movement and this drives a generator in the nacelle 104.

Figure 2:
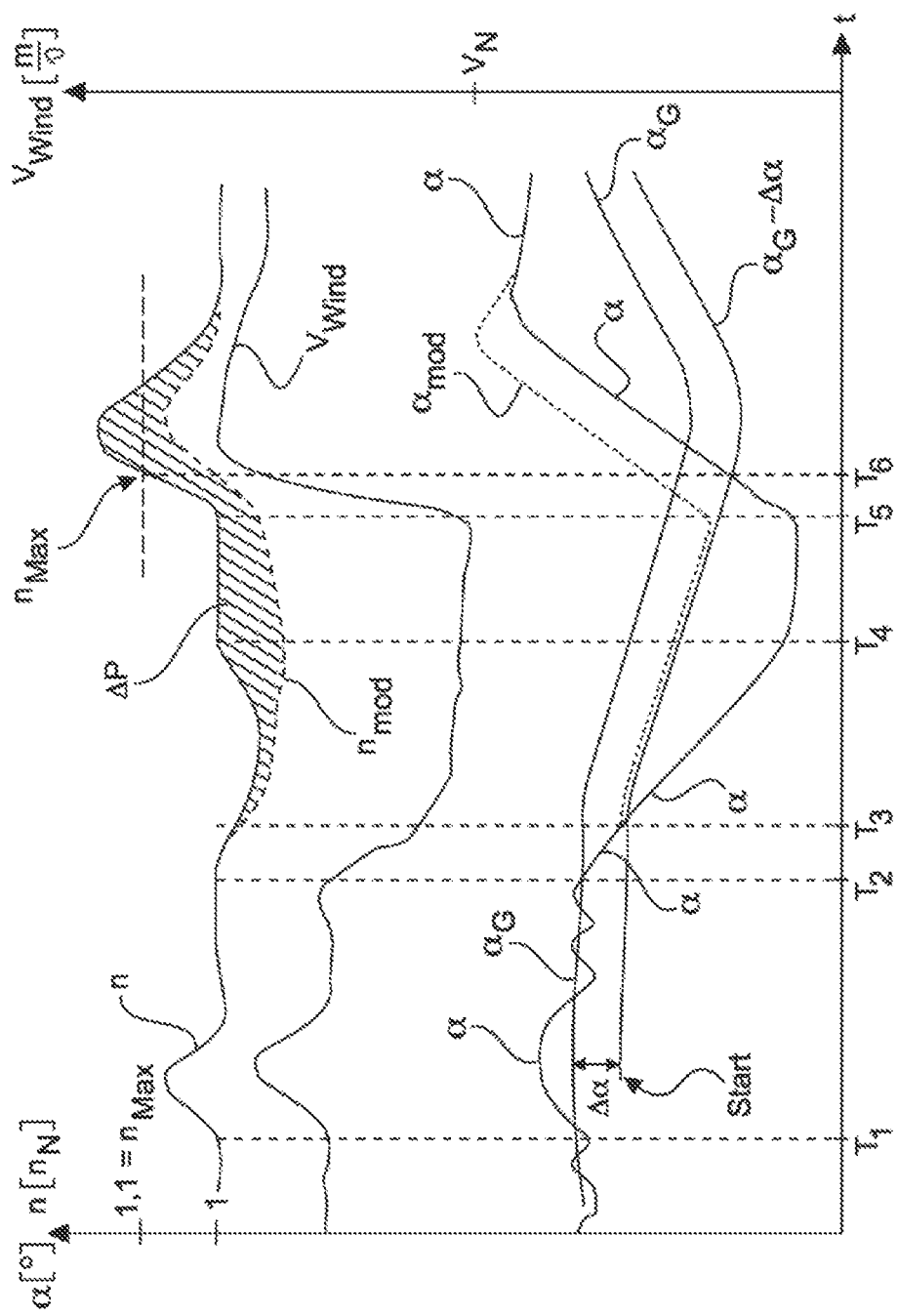
FIG. 2 shows a schematic diagram that illustrates relationships between rotational speed, wind speed and blade angle.

In FIG. 2, the wind speed $V_{wind}$, the blade angle $\alpha$ and the rotor rotational speed n are plotted over time. Although the axis label of the ordinate provides units for the corresponding variables, the exact values are not illustrated to facilitate explanation of the basic principles.

In addition to the actual blade angle $\alpha$, the possible curve of a limit angle $\alpha_G$ and a curve of the limit angle $\alpha_G$ minus a difference angle $\Delta\alpha$ are plotted (denoted as $\alpha_G$-$\Delta\alpha$ in this case). Moreover, two dotted partial curves are illustrated, namely a modified angle $\alpha_{mod}$ specifying the intended blade angle profile, and a rotational speed $n_{mod}$ showing the resultant rotational speed in this respect.

In the illustration of FIG. 2, the assumption is made that the wind speed rises at the time $T_1$ and that a gust is present at that time. At first, as the wind speed increases, there likewise is an increase in the rotational speed n. The blade angle $\alpha$ is also increased in order to counteract this. It is possible to identify that the blade angle $\alpha$ can vary slightly even before the time $T_1$ in order to keep the rotational speed n approximately constant. In this respect, keeping the rotational speed n constant prior to the time $T_1$ is also quite successful. However, the gust occurring immediately after the time $T_1$ leads to a noticeable increase in the rotational speed n.

The limit angle $\alpha_G$, which forms a mean value of the angle $\alpha$, can also be seen there in addition to the curve of the angle $\alpha$. Accordingly, there is a comparatively small change in the curve of the limit angle $\alpha_G$.

Moreover, the difference angle $\Delta\alpha$ is plotted for the limit angle $\alpha_G$. The limit angle $\alpha_G$ is allowed to be undershot by no more than the difference angle $\Delta\alpha$. Accordingly, a limit to be observed, which is plotted as $\alpha_G$-$\Delta\alpha$, arises. Said limit starts shortly after the time $T_1$, and this beginning is denoted by "Start". There was a detection at this time that a certain gustiness of the wind is present, and consequently the difference angle $\Delta\alpha$ was switched to be active. In this example, the limit angle $\alpha_G$ is always recorded, namely as a mean value of the angle $\alpha$. So that the difference angle $\Delta\alpha$ now finds use, the corresponding feedback control is also switched to be active, said feedback control monitoring whether there is observation of the limit angle $\alpha_G$ being undershot by no more than the difference angle $\Delta\alpha$.

Then, with increasing time, the gust passes and the wind speed $V_{Wind}$ once again approximately assumes the value prior to the time $T_1$. The rotational speed n could also be regulated to its initial value, namely the rated rotational speed $n_N$, in the meantime. The blade angle $\alpha$ has also been reduced correspondingly to a value approximately equal to that before the time $T_1$. Variations can still be identified; these are unavoidable as the wind also varies slightly. These variations can hardly still be identified in the limit angle $\alpha_G$, which, as stated previously, forms a mean value of this blade angle $\alpha$.

The wind speed starts to drop at the time $T_2$. Whether this is a start of a fundamental reduction in the wind speed or a gust trough cannot be identified. In any case, the wind speed drops comparatively strongly, and so there also is reduction in the rotational speed n at first. The blade angle $\alpha$ is likewise reduced in order now to keep the rotational speed n as constant as possible, namely to counteract the drop in rotational speed n. On account of the averaging, the limit angle $\alpha_G$ follows this curve of the blade angle $\alpha$ only weakly at first.

However, the wind speed $V_{Wind}$ continues to drop and, at the time $T_3$, the blade angle $\alpha$ then reaches a value that lies below the limit angle $\alpha_G$ by the difference angle $\Delta\alpha$. The proposed feedback control would now start here.

However, with the solid curve of the angle $\alpha$ and also the solid curve of the rotational speed n, FIG. 2 shows a curve that would set in without application of the proposed feedback control. Accordingly, the blade angle $\alpha$ would continue to drop until the rotational speed n can be adjusted to the original rotational speed, namely the rated rotational speed $n_N$ at the time $T_4$. By way of precaution, reference is made here to the fact that these assumptions, too, serve illustrative purposes and, by all means, it could also be the case that the wind speed then drops off so strongly that the wind turbine is in part-load operation and the rotational speed n cannot even hold the rated rotational speed $n_N$ due to a lack of wind. However, for illustrative purposes, the assumption is made that the described process plays out completely in full-load operation or for wind speeds that are usually settled in the full-load operation.

Consequently, it is now possible to keep the rotational speed n at its rated value $n_N$ according to the full line of the blade angle $\alpha$ and the rotational speed n.

Now, the wind speed increases strongly again at the time $T_5$. This may be typical in the case of a gusty wind speed. Accordingly, the rotational speed n also increases and the blade angle $\alpha$ likewise increases again in order to counteract this rise in the rotational speed n.

Now, the special situation is present where the wind speed is initially comparatively low and the blade angle $\alpha$ is also comparatively small but the rotational speed n nevertheless is at the rated value and therefore not far away from the limit rotational speed $n_{MAX}$ either. As a result of this now quickly increasing wind, the rotational speed also increases to such an extent that the controller of the blade angle is no longer able to sufficiently prevent the rotational speed from an increase that is too strong. Consequently, the rotational speed n then reaches the maximum value of the rotational speed $n_{max}$ at the time $T_6$ and consequently an emergency shutdown would have to be implemented at the time $T_6$; the latter would usually also be carried out because this is a safety aspect that cannot be precluded.

For illustration purposes, FIG. 2, however, shows the further curve of the rotational speed n, as if this emergency shutdown were deactivated. Accordingly, it is possible to identify that the rotational speed n still continues to rise slightly; however, it can then finally be adjusted too because the blade angle α likewise increases further, it can be lowered below the maximum rotational speed $n_{max}$ and it can finally be regulated to the value of the rated rotational speed $n_N$ as well.

If the method is now carried out using the proposed feedback control, the blade angle α will not be allowed to drop below the value of $α_G$-Δα at the time $T_3$ This deviating curve is illustrated there in dotted fashion. Consequently, this dotted line initially extends along the limit $α_G$-Δα. The result of this is that, initially, the rotational speed $n_{mod}$ drops off more strongly than would be the case without this feedback control. Even at the time $T_4$, this rotational speed $n_{mod}$ still is significantly lower than the rotational speed n without this proposed protective feedback control. At the time $T_5$, too, this rotational speed $n_{mod}$ still is significantly lower than the rotational speed n.

Then, at the time $T_5$, i.e., at a time when there is a strong increase in the wind, there is also a strong increase in blade angle, namely $α_{mod}$. Consequently, this blade angle $α_{mod}$ is already greater than the normal blade angle α. The rotational speed $n_{mod}$ can be regulated correspondingly strongly and an increase that is too high can be prevented. Moreover, what is advantageously additionally the case is that the rotational speed $n_{mod}$ is lower than the rotational speed n. Thus, the blade angle is greater than for the case without this protective feedback control and the rotational speed is lower than for the case without protective feedback control.

Consequently, this modified blade angle $α_{mod}$ leaves the limit characteristic $α_G$-Δα in the upward direction at the time $T_5$.

There is no peculiarity at the time $T_6$ for this curve when using the protective feedback control. However, it is possible to identify that the modified rotational speed $n_{mod}$ has not reached the limit rotational speed $n_{MAX}$ and a shutdown is consequently avoided.

Reference should also be made to the fact that the limit angle $α_G$ drops off in a comparatively gentle fashion even after the time $T_3$ because, in the process, it orients itself along the curve of the actual angle according to the modified blade angle $α_{mod}$.

Finally, a hatched region has additionally been plotted in the rotational speed characteristic, namely the region between the rotational speed curve without protective feedback control and the rotational speed curve $n_{mod}$ with protective feedback control. This hatched region illustrates the power losses that can arise due to the protective feedback control. It should be noted here that this only serves illustrative purposes and that, in fact, there would be an emergency shutdown at the time $T_6$. Then, naturally, the hatched region after this time $T_6$ would cease or, rather, it would be necessary to plot a hatched region below the dotted rotational speed characteristic $n_{mod}$, all the way down to the time axis. Thus, it is easily identifiable that the supposed power losses are low and, in any case, not negative in comparison with the case where an emergency shutdown was able to be in fact prevented. Purely by way of precaution, reference is made to the fact that this hatched region only serves for illustration purposes and that, naturally, the integration of the rotational speed over the time does not yield power, already in view of the units.

Consequently, a solution for preventing an unwanted emergency shutdown in the case of overspeed could be proposed in a simple manner. No hardware adaptation would be needed to this end. In particular, there is also no need to use stronger pitch motors. The proposed feedback control requires neither additional measurement variables nor additional manipulated variables.

The invention claimed is:

1. A method for controlling a wind turbine having rotor blades with an adjustable blade angle, comprising:
   operating the wind turbine in a part-load operation for wind speeds up to a rated wind speed,
   operating the wind turbine in a full-load operation for wind speeds above the rated wind speed,
   increasing the blade angle in the full-load operation as wind speed increases,
   setting a limit angle to a mean value or filtered value of last set blade angles, and
   controlling the wind turbine such that the blade angle undershoots the limit angle is by an angle that does not exceed a predetermined difference angle.

2. The method as claimed in claim 1, wherein:
   controlling the wind turbine such that the limit angle is undershot by the angle that does not exceed the predetermined difference angle when at least one condition occurs from a list of conditions including:
   a predetermined gustiness of wind is reached,
   a predetermined gust frequency of the wind is reached, and
   a peak rotational speed, higher than a rated rotational speed by more than a predetermined tolerance value, is reached at least once within a predetermined period of time.

3. The method as claimed in claim 1, comprising:
   setting the limit angle or the predetermined difference angle based on wind gustiness.

4. The method as claimed in claim 1, comprising:
   selecting a value of the predetermined difference angle from a list including:
   a value range from 0 to 10°,
   a value range from 3 to 8°, and
   a value that is substantially 5°.

5. The method as claimed in claim 1, wherein determining the mean value includes at least one of:
   forming the mean value of the last set blade angles over a period of time with a length of 5 to 20 seconds,
   forming the mean value of the last set blade angles over a period of time with a length of 6 to 15 seconds, or
   forming the mean value of the last set blade angles over a period of time with a length of approximately 8 seconds.

6. The method as claimed in claim 1, comprising:
   setting the limit angle or the predetermined difference angle based on a gust frequency.

7. The method as claimed in claim 1, wherein a fixed part-load angle is provided for the blade angle during the part-load operation, and wherein the limit angle or the limit angle minus the predetermined difference angle is not smaller than the fixed part-load angle.

8. The method as claimed in claim 1, wherein the limit angle decreases over time or decreases with a gradient that is dependent on time.

9. The method as claimed in claim 8, wherein the limit angle decreases linearly over time or decreases with a gradient that is linearly dependent on time.

10. The method as claimed in claim 1, wherein determining the filtered value includes at least one of:

low-pass filtering the last set blade angles,
low-pass filtering the last set blade angles with a first-order low-pass filter having a time constant in a range of 5 to 20 seconds,
low-pass filtering the last set blade angles with a first-order low-pass filter having a time constant in a range of 6 to 15 seconds, or
low-pass filtering the last set blade angles with a first-order low-pass filter having a time constant of approximately 8 seconds.

11. A wind turbine, comprising:
at least one adjustable rotor blade, and
a controller for adjusting the at least one rotor blade, wherein the controller is configured to control the at least one rotor blade by at least:
   operating the wind turbine in a part-load operation for wind speeds up to a rated wind speed,
   operating the wind turbine in a full-load operation for wind speeds above the rated wind speed,
   increasing a blade angle of the at least one rotor blade in the full-load operation as wind speed increases,
   setting a limit angle as a mean value or a filtered value of last set blade angles, and
   controlling the wind turbine such that the blade angle undershoots the limit angle by an angle that does not exceed a predetermined difference angle.

12. The wind turbine as claimed in claim 11, wherein the controller is programmed, with a control program, that causes the controller to control the at least one rotor blade.

13. The wind turbine as claimed in claim 11, wherein the controller is configured to:
   control the wind turbine such that the limit angle is undershot by the mangle that does not exceed the predetermined difference angle when at least one condition occurs from a list of conditions including:
      a predetermined gustiness of wind is reached,
      a predetermined gust frequency of wind is reached, and
      a peak rotational speed, higher than a rated rotational speed by more than a predetermined tolerance value, is reached at least once within a predetermined period of time.

14. The wind turbine as claimed in claim 11, wherein the controller is configured to:
   set the limit angle or the predetermined difference angle based on wind gustiness.

15. The wind turbine as claimed in claim 11, wherein the controller is configured to:
   select a value of the predetermined difference angle from a list including:
      a value range from 0 to 10°,
      a value range from 3 to 8°, and
      a value that is substantially 5°.

16. The wind turbine as claimed in claim 11, wherein the controller is configured to determine the mean value by at least one of:
   forming the mean value of the last set blade angles over a period of time with a length of 5 to 20 seconds,
   forming the mean value of the last set blade angles over a period of time with a length of 6 to 15 seconds, or
   forming the mean value of the last set blade angles over a period of time with a length of approximately 8 seconds.

17. The wind turbine as claimed in claim 11, wherein the controller is configured to:
   set the limit angle or the predetermined difference angle based on a gust frequency.

18. The wind turbine as claimed in claim 11, wherein a fixed part-load angle is provided for the blade angle during the part-load operation, and wherein the limit angle or the limit angle minus the predetermined difference angle is not smaller than the fixed part-load angle.

* * * * *

UNITED STATES PATENT AND TRADEMARK OFFICE
CERTIFICATE OF CORRECTION

Page 1 of 1

PATENT NO. : 10,995,731 B2
APPLICATION NO. : 16/061622
DATED : May 4, 2021
INVENTOR(S) : Wolfgang De Boer It is certified that error appears in the above-identified patent and that said Letters Patent is hereby corrected as shown below:

In the Claims

Column 10, Claim 2, Line 28:
"of the wind is reached," should read: --of wind is reached,--.

Column 11, Claim 13, Line 33:
"by the mangle that does not" should read: --by the angle that does not--.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*